United States Patent
Fujita et al.

(10) Patent No.: US 10,000,195 B2
(45) Date of Patent: Jun. 19, 2018

(54) BICYCLE CONTROL APPARATUS

(71) Applicant: Shimano Inc., Sakai, Osaka (JP)

(72) Inventors: Junya Fujita, Osaka (JP); Etsuyoshi Watarai, Osaka (JP); Mitsuru Tauchi, Osaka (JP)

(73) Assignee: Shimano Inc., Osaka (JP)

( * ) Notice: Subject to any disclaimer, the term of this patent is extended or adjusted under 35 U.S.C. 154(b) by 106 days.

(21) Appl. No.: 14/296,890

(22) Filed: Jun. 5, 2014

(65) Prior Publication Data

US 2015/0039165 A1 Feb. 5, 2015

(30) Foreign Application Priority Data

Jul. 30, 2013 (JP) .................................. 2013-158057

(51) Int. Cl.
*B60W 10/08* (2006.01)
*B62M 6/45* (2010.01)
*B62M 6/50* (2010.01)

(52) U.S. Cl.
CPC .............. *B60W 10/08* (2013.01); *B62M 6/45* (2013.01); *B62M 6/50* (2013.01); *B60W 2300/36* (2013.01)

(58) Field of Classification Search
CPC .......... B62M 6/45; B62M 6/50; B60W 10/08; B60W 2300/03; G01L 25/006
See application file for complete search history.

(56) References Cited

U.S. PATENT DOCUMENTS

| | | | |
|---|---|---|---|
| 2002/0094906 A1* | 7/2002 | Jordan ................... | B62M 25/08 475/254 |
| 2010/0244401 A1* | 9/2010 | Hara ...................... | B62M 9/122 280/261 |
| 2014/0074348 A1* | 3/2014 | Kitamura .............. | G01L 25/006 701/33.1 |

FOREIGN PATENT DOCUMENTS

| | | | | |
|---|---|---|---|---|
| CN | 201074018 Y | 6/2008 | | |
| DE | 10 2010 039 852 A1 | 3/2012 | | |
| DE | 10 2013 014 332 A1 | 3/2014 | | |
| JP | 6-317492 A | 11/1994 | | |
| JP | 10-59264 A | 3/1998 | | |
| JP | 2000-272574 A | 10/2000 | | |
| JP | 2001-10581 A | 1/2001 | | |
| JP | 3555311 B2 | 5/2004 | | |
| JP | 2011-225093 A | 11/2011 | | |
| WO | WO 2012025314 A1 * | 3/2012 | ......... | A63B 24/0062 |

\* cited by examiner

*Primary Examiner* — Thomas G Black
*Assistant Examiner* — Ce Li Li
(74) *Attorney, Agent, or Firm* — Global IP Counselors, LLP

(57) ABSTRACT

A bicycle control apparatus is basically provided for controlling a bicycle having a drive assistance electric motor. The bicycle control apparatus includes a manual drive force detector, a state detector and a controller. The manual drive force detector is configured to detect a manual drive force. The state detector is configured to detect a state of the bicycle. The controller is programmed to execute calibration of the manual drive force detector upon the controller determining that a prescribed bicycle state condition exists after power of the bicycle control apparatus is turned on.

15 Claims, 7 Drawing Sheets

BICYCLE CONTROL APPARATUS

CROSS-REFERENCE TO RELATED APPLICATIONS

This application claims priority under 35 U.S.C. § 119 to Japanese Patent Application No. 2013-158057, filed Jul. 30, 2013. The entire disclosure of Japanese Patent Application No. 2013-158057 is hereby incorporated herein by reference.

BACKGROUND

Field of the Invention

This invention generally relates to a bicycle control apparatus. More specifically, the present invention relates to a bicycle control apparatus for controlling a bicycle having a drive assistance electric motor.

Background Information

In recent years, electrically assisted bicycles that assist riding by supplementing a person's pedaling force with a motor drive force are becoming popular (for example, Japanese Laid-Open Patent Publication No. 2001-10581). This electrically assisted bicycle has a bicycle control apparatus that determines an assist force for assisting riding depending on a manual drive force such as a torque acting on a crank axle or a tensile force of a chain. The bicycle control apparatus is configured to determine that the manual drive force is zero when a signal output from a manual drive force detector is a prescribed value.

SUMMARY

However, the value of the signal output from the manual drive force detector sometimes varies from the prescribed value even if the manual drive force actually acting on the bicycle is zero with the use of the electrically assisted bicycle. Therefore, there is a problem that the bicycle control apparatus cannot accurately detect the manual drive force.

One object of the present invention is to provide a bicycle control apparatus that can accurately detect a manual drive force.

According to a first aspect of the present invention, a bicycle control apparatus that controls a bicycle having a drive assistance electric motor basically comprises a manual drive force detector, a state detector and a controller. The manual drive force detector is configured to detect a manual drive force. The state detector is configured to detect a state of the bicycle. The controller is programmed to execute calibration of the manual drive force detector upon the controller determining that a prescribed bicycle state condition exists after power of the bicycle control apparatus is turned on.

With this configuration, the controller executes calibration of the manual drive force detector when the state of the bicycle satisfies the prescribed condition after the power is turned on. Specifically, the controller executes calibration of the manual drive force detector when the bicycle is actually operated after the power is turned on. Therefore, the bicycle control apparatus can accurately detect a manual drive force. Here, the state detector does not detect a manual drive force differently from the manual drive force detector.

Preferably, the state detector is configured to detect whether an operating unit of the bicycle has been operated or not to select a condition of assistance by the drive assistance electric motor. The controller is programmed to determine that the state of the bicycle satisfies the prescribed condition when the state detector detects that the operating unit has been operated.

Preferably, the state detector is configured to detect at least one of movement of a wheel, movement of a crank, movement of a handle, vibration of the bicycle, acceleration of the bicycle and inclination of the bicycle as the state of the bicycle.

Preferably, the manual drive force is a torque acting on a crank axle of the bicycle, Preferably, the manual drive force detector outputs a signal based on the manual drive force.

Preferably, the controller is programmed to execute the calibration such that a value of the signal at the time of executing the calibration corresponds to a zero point of the manual drive force.

Preferably, the controller is programmed to execute the calibration when the controller further determines that a value of the signal is within a prescribed range during a prescribed period of time. With this configuration, the calibration of the manual drive force detector can be executed at a more appropriate timing.

Preferably, the bicycle control apparatus further comprises a rotation state detector is configured to detect a rotation state of a crank of the bicycle. The controller is further programmed to execute the calibration when the controller further determines that the crank stops or the crank rotates backward based on the rotation state. With this configuration, the calibration of the manual drive force detector can be executed at a more appropriate timing.

Preferably, the rotation state detector detects cadence as the rotation state.

Preferably, the controller is programmed to determine that the crank stops or the crank rotates backward when the cadence is zero or less.

According to a second aspect of the present invention, a bicycle control apparatus that controls a bicycle having a drive assistance electric motor basically comprises a rotation state detector, a manual drive force detector and a controller. The rotation state detector is configured to detect a rotation state of a crank of the bicycle. The manual drive force detector outputs a signal based on the manual drive force. The controller is programmed to execute calibration of the manual drive force detector when the controller determines that a value of the signal is within a prescribed range during a prescribed period of time and the crank stops or the crank rotates backward based on the rotation state.

With this configuration, calibration of the manual drive force detector is executed when a value of the signal of the manual drive force detector is within a prescribed range during a prescribed period of time and the crank stops or the crank rotates backward. Specifically, the controller executes calibration of the manual drive force detector when no manual drive force acts on the bicycle. Therefore, the signal output from the manual drive force detector can be appropriately maintained.

Preferably, the rotation state detector is configured to detect cadence as the rotation state.

Preferably, the controller is programmed to determine that the crank stops or the crank rotates backward when the cadence is zero or less.

Preferably, the controller is programmed to execute the calibration such that a value of the signal at the time of executing the calibration corresponds to a zero point of the manual drive force.

Preferably, the manual drive force is a torque acting on a crank axle of the bicycle.

With this configuration, the bicycle control apparatus according to the present invention can accurately detect a manual drive force.

Also other Objects, features, aspects and advantages of the disclosed bicycle control apparatus will become apparent to those skilled in the art from the following detailed description, which, taken in conjunction with the annexed drawings, discloses one embodiment of the bicycle control apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
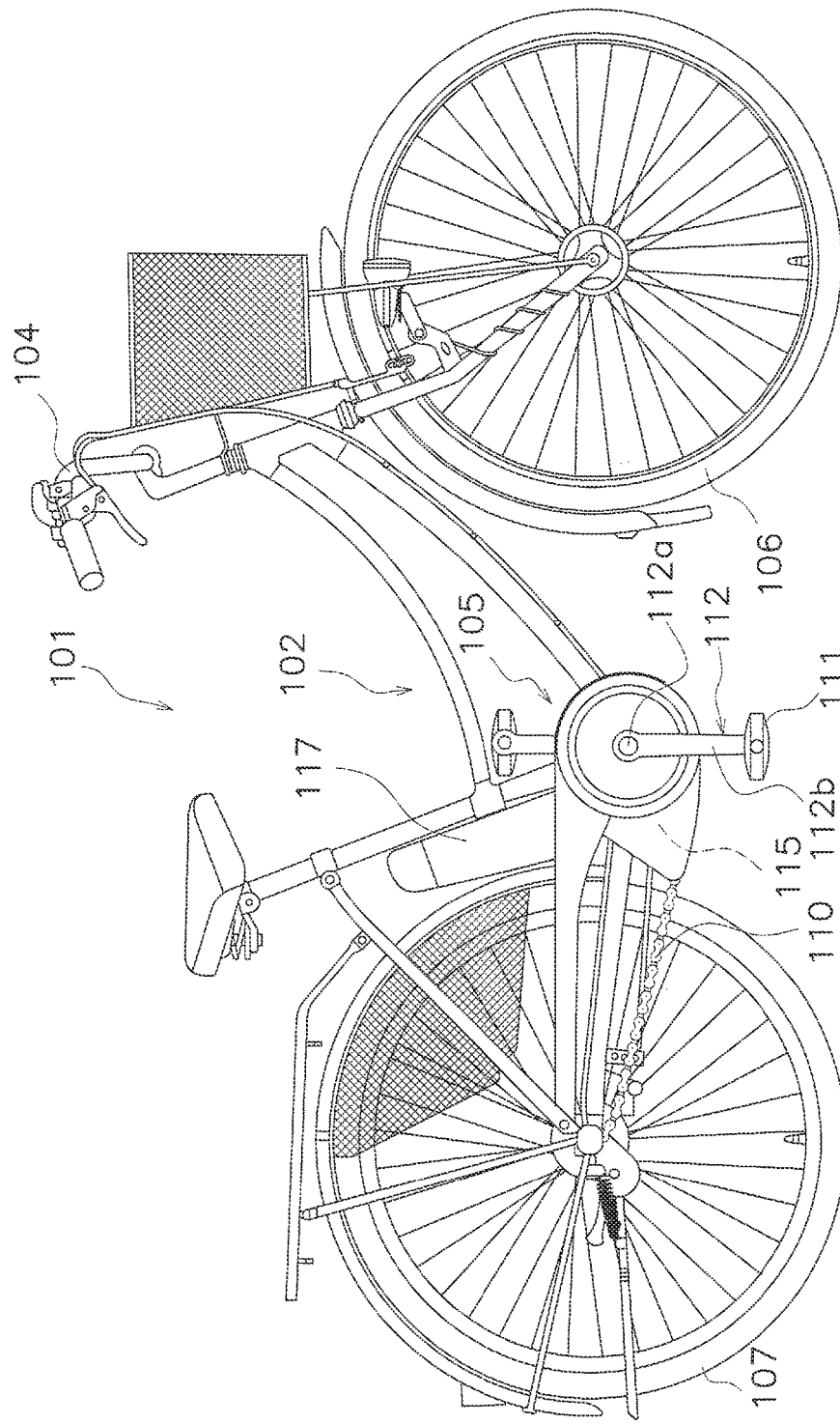
FIG. 1 is a side elevational view of a bicycle that is equipped with a bicycle control apparatus in accordance with one illustrated embodiment.

Referring initially to FIG. 1, a bicycle 101 is illustrated that is equipped with a bicycle control apparatus 1 in accordance with a first embodiment. FIG. 1 is a side elevational view of a bicycle 101. As shown in FIG. 1, in addition to the control apparatus 1, the bicycle 101 according to the first embodiment further includes a frame 102, a handle 104, a drive section 105, a front wheel 106 and a rear wheel 107.

The drive section 105 has a chain 110, a pair of pedals 111, a crank 112, an assist mechanism 115 and a rechargeable battery 117. The pedals 111 are attached to the crank 112. These components are supported on the frame 102. The rechargeable battery 117 is detachable to the frame 102, and serves as a power supply for the assist mechanism 115. The crank 112 includes a crank axle 112a and a pair of crank arms 112b. The crank arms 112b are provided on opposite ends of the crank axle 112a. The rechargeable battery 117 is a storage battery that uses, for example, a nickel hydride cell or a lithium ion cell and is detachably mounted to the frame 102.

Figure 2:
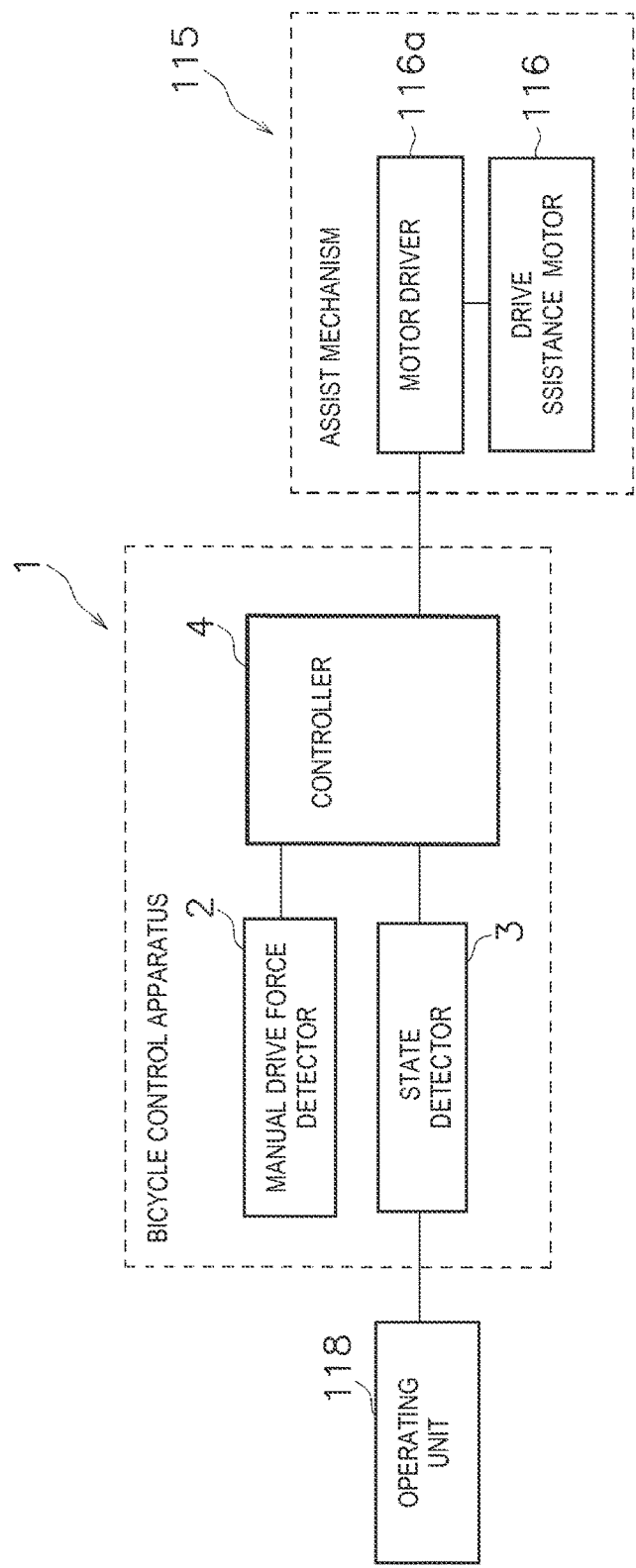
FIG. 2 is a block diagram of a bicycle control apparatus according to a first embodiment.

FIG. 2 is a block diagram that explains the bicycle control apparatus 1. As shown in FIG. 2, the bicycle control apparatus 1 has a manual drive force detector 2, a state detector 3 and a controller 4. An operating unit 118 and the assist mechanism 115 are connected to the bicycle control apparatus 1.

The operating unit 118 is provided on the bicycle 101, and is mounted, for example, to the handle 104. By operating the operating unit 118, the assist condition of the assist mechanism 115 is selected. The operating unit 118 includes an operating switch. For example, by operating the operating unit 118, any one of a plurality of assist conditions can be selected, including a first assist condition, a second assist condition and a third assist condition. For example, when the first assist condition is selected, the riding is assisted with an assist force that is at most twice as large as the torque acting on the crank axle 112a. When the second assist condition is selected, the riding is assisted with an assist force that is at most 1.5 times as large as the torque acting on the crank axle 112a. When the third assist condition is selected, the riding is assisted with an assist force that is at most as large as the torque acting on the crank axle 112a. Also, an OFF mode with no riding assistance of the assist mechanism 115 can be selected by the operating unit 118.

The assist mechanism 115 has a drive assistance motor (one example of a drive assistance electric motor) 116 and a motor driver 116a. The drive assistance motor 116 is controlled by the motor driver 116a. The motor driver 116a controls the drive assistance motor 116 based on a command of the controller 4.

The manual drive force detector 2 detects a manual drive force. More specifically, the manual drive force detector 2 outputs a signal based on a manual drive force. For example, the manual drive force detector 2 is a torque sensor and outputs a signal (for example, electric voltage) based on the torque acting on the crank axle 112a of the crank 112. For example, the torque sensor can be a magnetostrictive sensor or a strain gauge. The controller 4 controls the assist mechanism 115 based on a signal acquired from the manual drive force detector 2. For example, the controller 4 causes the drive assistance motor 116 to generate a supplementary torque that is prescribed times as large as the torque acting on the crank axle 112a. The controller 4 determines the supplementary torque generated by the drive assistance motor 116 based on the assist condition selected by the operating unit 118.

The state detector 3 detects the state of the bicycle 101. More specifically, the state detector 3 is connected to the operating unit 118. The state detector 3 detects whether the operating unit 118 has been operated or not as the state of the bicycle 101. The state detector 3 can be incorporated into the operating unit 118.

The controller 4 executes calibration of the manual drive force detector 2 when the controller 4 determines that the state of the bicycle 101 satisfies a prescribed condition after the power of the bicycle control apparatus 1 is turned on. More specifically, the controller 4 determines that the state of the bicycle 101 satisfies the prescribed condition when the state detector 3 detects that the operating unit 118 has been operated.

The controller 4 executes calibration of the manual drive force detector 2 when the controller 4 determines that the state of the bicycle 101 satisfies the prescribed condition. For example, the controller 4 executes calibration such that a value of a signal (for example, a value of electric voltage) of the manual drive force detector 2 at the time of executing the calibration corresponds to the zero point of the torque. The controller 4 is constructed, for example, by a microcomputer, and includes a CPU (central processing unit), a RAM (random access memory), a ROM (read only memory), an I/O interface, and the like.

Figure 3:
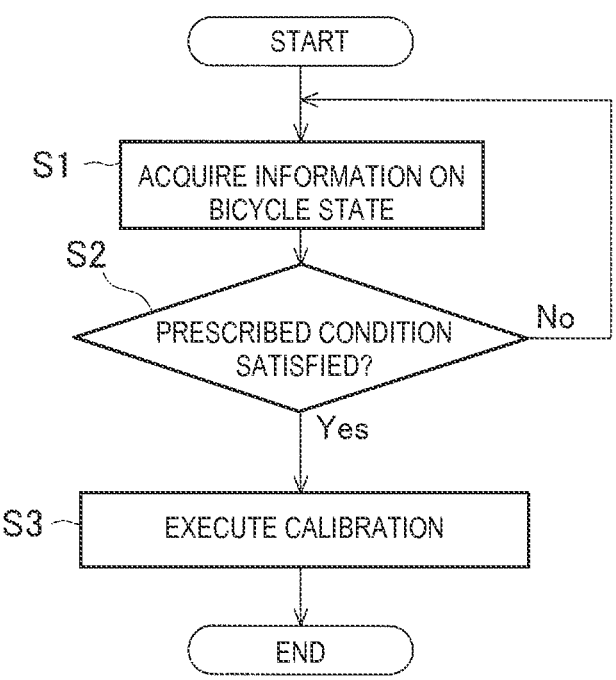
FIG. 3 is a flowchart that shows an operation process executed by the bicycle control apparatus according to the first embodiment.

Next, an operation of the above-described bicycle control apparatus 1 will be explained with reference to FIG. 3. FIG. 3 is a flowchart that explains an operation of the bicycle control apparatus 1.

When the power of the bicycle control apparatus 1 is turned on, the controller 4 acquires information on the state of the bicycle from the state detector 3 (step S1). Specifically, the controller 4 acquires information on whether or not the operating unit 118 has been operated from the state detector 3.

Next, the controller 4 determines whether or not the state of the bicycle satisfies the prescribed condition (step S2). Specifically, the controller 4 determines whether or not the operating unit 118 has been operated.

On the other hand, when the controller 4 determines that the state of the bicycle satisfies the prescribed condition (Yes in step S2), the controller 4 executes calibration of the manual drive force detector 2 (step S3). Specifically, the controller 4 executes calibration such that a value of a signal (for example, a value of electric voltage) output from the manual drive force detector 2 at the time of executing the calibration corresponds to the zero point of the torque.

When the controller 4 determines that the state of the bicycle does not satisfy the prescribed condition (No in step S2), the controller 4 returns to the above-described process of step S1.

Preferably, once the above-described calibration process of the manual drive three detector 2 has been executed, it will not be executed until the power of the bicycle control apparatus 1 is turned off.

Second Embodiment

Next, a bicycle control apparatus 1a according to a second embodiment will be explained. Since the bicycle 101 to which the bicycle control apparatus 1a according to the second embodiment is applied is the same as the bicycle 101 explained in the above-described first embodiment, it will not be explained here.

Figure 4:
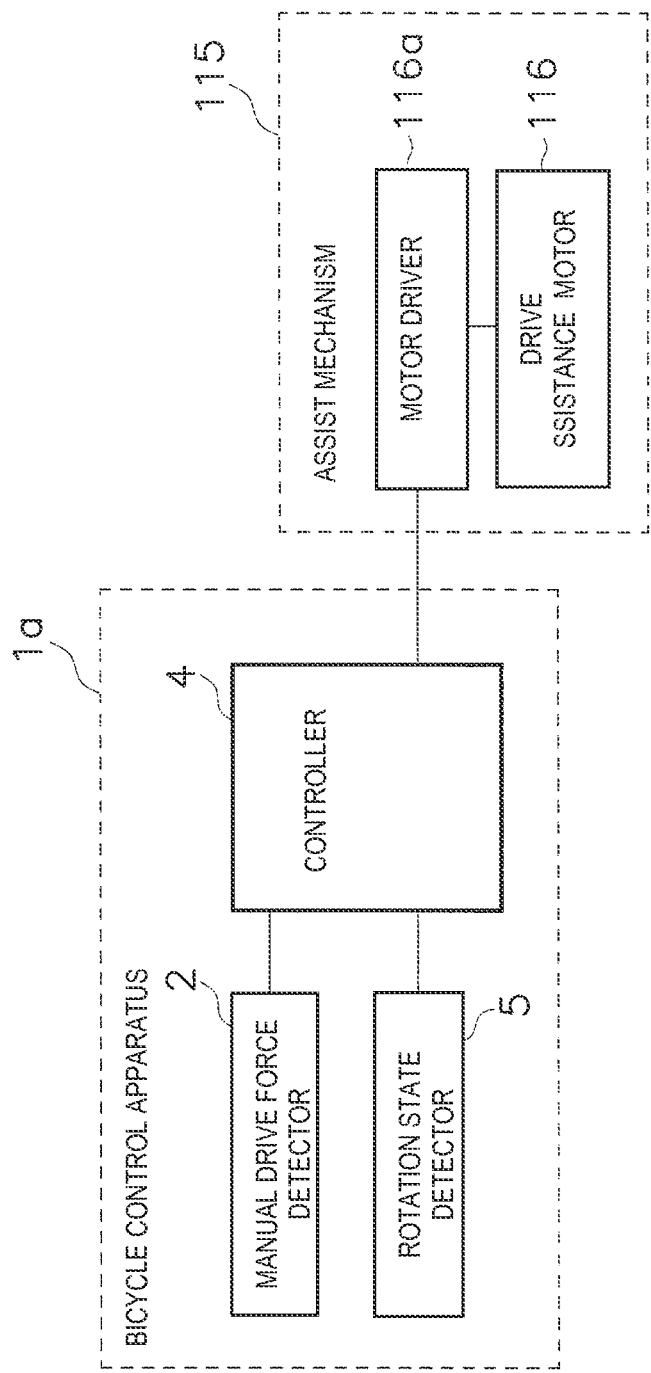
FIG. 4 is a block diagram of a bicycle control apparatus according to a second embodiment.

FIG. 4 is a block diagram that explains the bicycle control apparatus 1a according to the second embodiment. As shown in FIG. 4, the bicycle control apparatus 1a has the manual drive force detector 2, a rotation state detector 5, and the controller 4. The assist mechanism 115 is connected to the bicycle control apparatus 1a. Since the manual drive force detector 2 and the assist mechanism 115 are the same as ones that have been explained in the above-described first embodiment, they will not be explained here.

The rotation state detector 5 detects the rotation state of the crank 112. More specifically, the rotation state detector 5 detects cadence as the rotation state of the crank 112. For example, the rotation state detector 5 can be constructed by a cadence sensor that detects cadence of the crank 112.

The controller 4 executes calibration of the manual drive force detector 2 when the controller 4 determines that both of the following two conditions are satisfied. As a first condition, the controller 4 determines whether or not the value of a signal output from the manual drive three detector 2 is within a prescribed range during a prescribed period of time. Specifically, the manual drive force detector 2 is a torque sensor and outputs electric voltage based on the torque acting on the crank axle 112a. The controller 4 determines whether or not the value of the electric voltage is within a prescribed range during a prescribed period of time. The prescribed period of time can be, for example, a range of approximately 1 second to 5 seconds, and preferably, approximately 3 seconds are selected. For example, it is determined whether or not the value of the electric voltage is within the prescribed range based on whether or not the amplitude of the value of the electric voltage (the difference between the maximum value and the minimum value of the electric voltage during the prescribed period of time) is 6% or less, preferably 2% or less of a maximum fluctuation range. The maximum fluctuation range refers to the range of the electric voltage that corresponds to the range of the torque measured by the manual drive force detector 2.

As a second condition, the controller 4 determines whether or not the crank stops, or whether or not the crank rotates backward. Specifically, the controller 4 determines whether or not the cadence detected by the rotation state detector 5 is 0 rpm or less.

The controller 4 executes calibration of the manual drive force detector 2 when the controller 4 determines that the above-described first and second conditions are satisfied. For example, the controller 4 executes calibration such that a value of a signal (for example, a value of electric voltage) of the manual drive force detector 2 at the time of executing the calibration corresponds to the zero point of the torque. The controller 4 is constructed, for example, by a microcomputer, and includes a CPU (central processing unit), a RAM (random access memory), a ROM (read only memory), an I/O interface, and the like.

Figure 5:
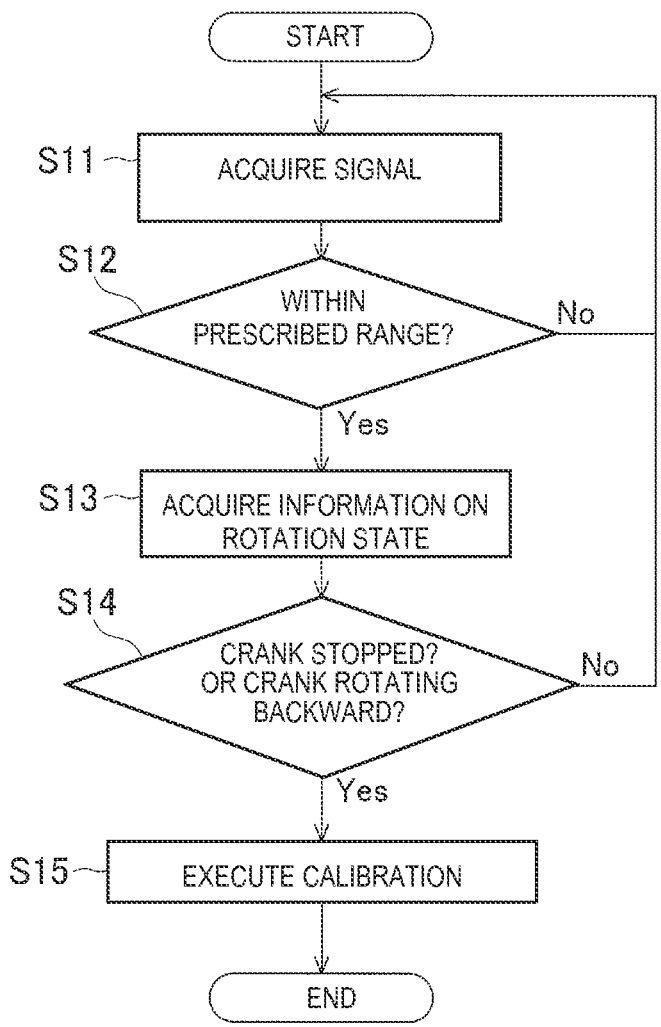
FIG. 5 is a flowchart that shows an operation process executed by the bicycle control apparatus according to the second embodiment.

Next, an operation of the above-described bicycle control apparatus 1a will be explained with reference to FIG. 5. FIG. 5 is a flowchart that explains an operation of the bicycle control apparatus 1a.

When the power of the bicycle control apparatus 1a is turned on, the controller 4 acquires a signal output from the manual drive force detector 2 (step S11). Specifically, the controller 4 acquires information on electric voltage output from the manual drive three detector 2.

Next, the controller 4 determines whether or not the value of the acquired signal is within the prescribed range during the prescribed period of time (step S12). Specifically, the controller 4 determines whether or not the electric voltage output from the manual drive force detector 2 is within the prescribed range during the prescribed period of time.

When the controller 4 determines that the value of the acquired signal is within the prescribed range during the prescribed period of time (Yes in step S12), the controller 4 proceeds to step S13 described below. On the other hand, when the controller 4 determines that the value of the acquired signal is not within the prescribed range during the prescribed period of time (No in step S12), the controller 4 returns to the above-described process of step S11.

Next, the controller 4 acquires information on the rotation state of the crank 112 from the rotation state detector 5 (step S13). Specifically, the controller 4 acquires information on the cadence detected by the rotation state detector 5.

Next, the controller 4 determines whether or not the crank 112 stops, or whether or not the crank 112 rotates backward based on the acquired information on the rotation state (step S14). Specifically, the controller 4 determines whether or not the cadence is 0 rpm or less. When the controller 4 determines that the crank 112 stops or the crank 112 rotates backward (Yes in step S14), the controller 4 proceeds to step S15 described below. When the controller 4 determines that the crank 112 does not stop or the crank 112 does not rotate backward, that is, the crank 112 rotates forward (No in step S14), the controller 4 returns to the above-described process of step S11. Incidentally, when the crank 112 rotates forward, the bicycle 101 moves forward.

Next, the controller 4 executes calibration of the manual drive force detector 2 (step S15). Specifically, the controller 4 executes the calibration such that the value of the signal (for example, the value of the electric voltage) output from the manual drive force detector 2 at the time of executing the calibration corresponds to the zero point of the torque.

Preferably, once the above-described calibration process of the manual drive force detector 2 has been executed, it will not be executed until the power of the bicycle control apparatus 1*a* is turned off.

Third Embodiment

Next, a bicycle control apparatus 1*b* according to a third embodiment will be explained. Since the bicycle 101 to which the bicycle control apparatus 1*b* according to the third embodiment is applied is the same as the bicycle 101 explained in the above-described first embodiment, it will not be explained here.

Figure 6:
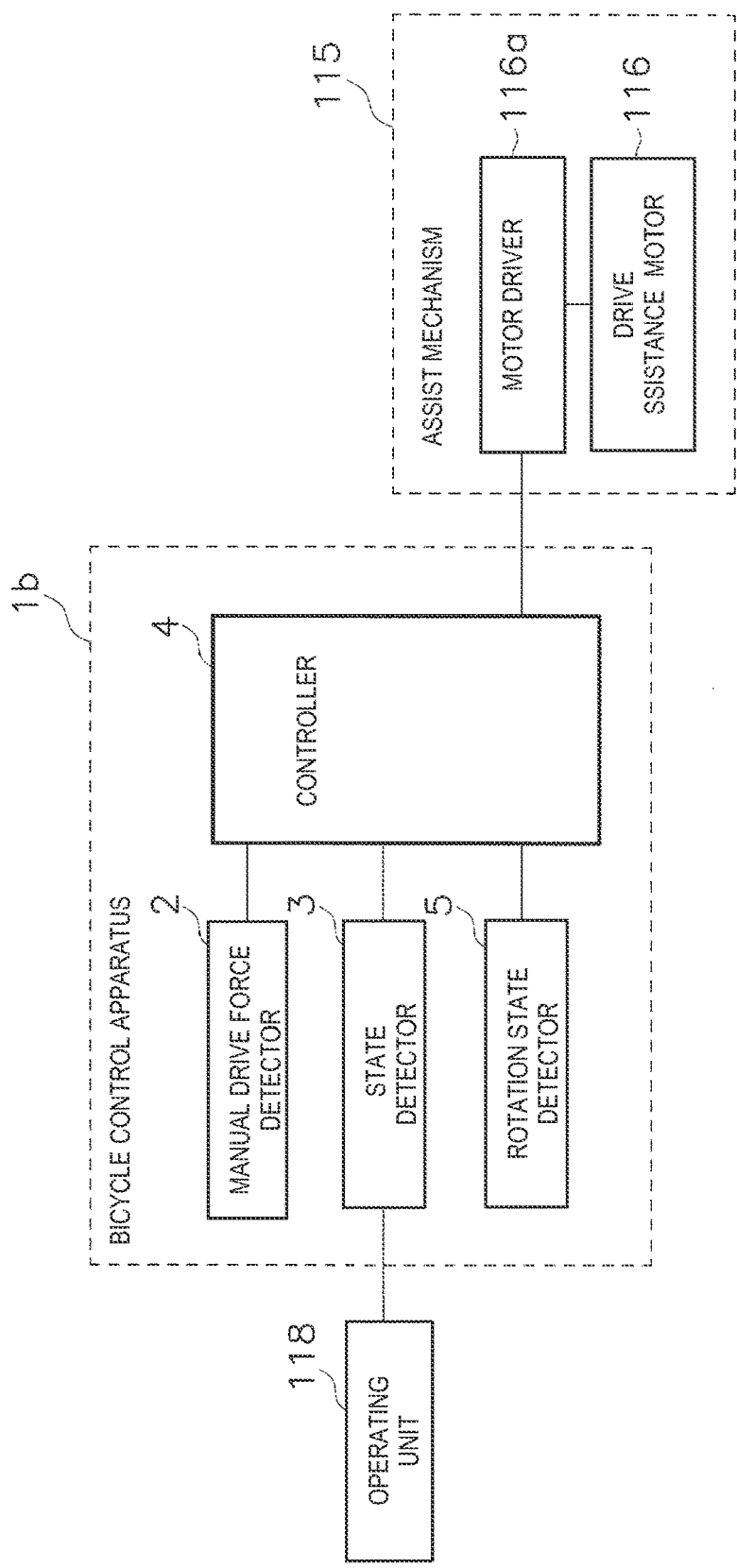
FIG. 6 is a block diagram of a bicycle control apparatus according to a third embodiment.

FIG. 6 is a block diagram that explains the bicycle control apparatus 1*b* according to the third embodiment. As shown in FIG. 6, the bicycle control apparatus 1*b* has the manual drive force detector 2, the state detector 3, the rotation state detector 5, and the controller 4. The assist mechanism 115 and the operating unit 118 are connected to the bicycle control apparatus 1*b*. Since the manual drive force detector 2, the state detector 3, the assist mechanism 115, and the operating unit 118 are the same as ones that have been explained in the above-described first embodiment, it will not be explained here. Also, the rotation state detector 5 is the same as one that has been explained in the above-described first embodiment, they will not be explained here.

The controller 4 executes calibration of the manual drive force detector 2 when the controller 4 determines that the following three conditions are satisfied. As first condition, the controller 4 determines whether or not the state of the bicycle 101 satisfies a prescribed condition after the power of the bicycle control apparatus 1*b* is turned on. More specifically, the controller 4 determines that the state of the bicycle 101 satisfies the prescribed condition when the state detector 3 detects that the operating unit 118 has been operated.

As a second condition, the controller 4 determines whether or not the value of a signal output from the manual drive force detector 2 is within a prescribed range during a prescribed period of time. Specifically, the manual drive force detector 2 is a torque sensor and outputs electric voltage based on the torque acting on the crank axle 112*a*. The controller 4 determines whether or not the value of the electric voltage is within a prescribed range during a prescribed period of time. The prescribed period of time can be, for example, a range of approximately one second to five seconds, and preferably, approximately three seconds are selected. For example, it is determined whether or not the value of the electric voltage is within the prescribed range based on whether or not the amplitude of the value of the electric voltage (the difference between the maximum value and the minimum value of the electric voltage during the prescribed period of time) is 6% or less, preferably 2% or less of a maximum fluctuation range. The maximum fluctuation range refers to the range of the electric voltage that corresponds to the range of the torque measured by the manual drive force detector 2.

As a third condition, the controller 4 determines whether or not the crank stops, or whether or not the crank rotates backward. Specifically, the controller 4 determines whether or not the cadence detected by the rotation state detector 5 is 0 rpm or less.

The controller 4 executes calibration of the manual drive force detector 2 when the controller determines that all of the above-described first to third conditions are satisfied. For example, the controller 4 executes calibration such that a value of a signal (for example, a value of electric voltage) of the manual drive force detector 2 at the time of executing the calibration corresponds to the zero point of the torque. The controller 4 is constructed, for example, by a microcomputer, and includes a CPU (central processing unit), a RAM (random access memory), a ROM (read only memory), an I/O interface, and the like.

Figure 7:
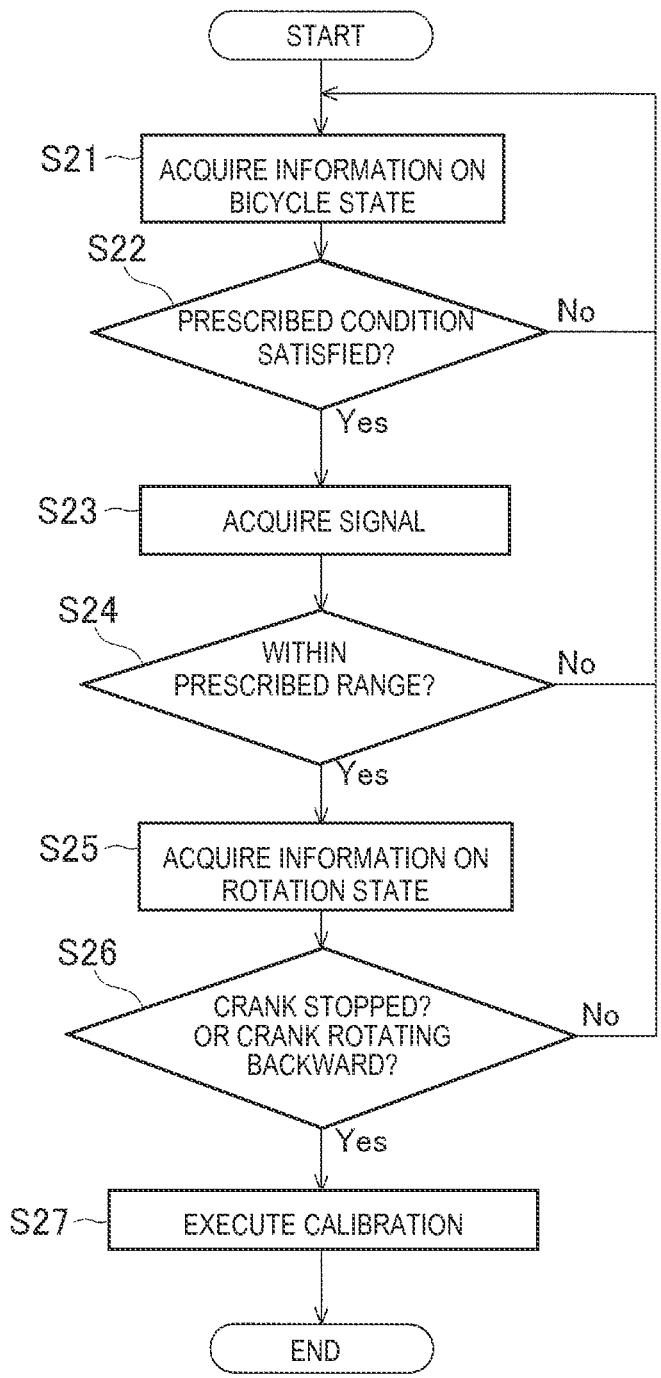
FIG. 7 is a flowchart that shows operation process executed by the bicycle control apparatus according to the third embodiment.

Next, an operation of the above-described bicycle control apparatus 1*b* will be explained with reference to FIG. 7. FIG. 7 is a flowchart that explains an operation of the bicycle control apparatus 1*b*.

When the power of the bicycle control apparatus 1*b* is turned on, the controller 4 acquires information on the state of the bicycle from the state detector 3 (step S21). Specifically, the controller 4 determines whether or not the operating unit 118 has been operated.

Next, the controller 4 determines whether or not the state of the bicycle satisfies the prescribed condition (step S22). Specifically, the controller 4 determines whether or not the operating unit 118 has been operated.

When the controller 4 determines that the state of the bicycle satisfies the prescribed condition (Yes in step S22), the controller 4 proceeds to step S23 described below. On the other hand, when the controller 4 determines that the state of the bicycle does not satisfy the prescribed condition (No in step S22), the controller 4 returns to the above-described process of step S21.

Next, the controller 4 acquires a signal output from the manual drive force detector 2 (step S23). Specifically, the controller 4 acquires information on electric voltage output from the manual drive force detector 2.

Next, the controller 4 determines whether or not the value of the acquired signal is within the prescribed range during the prescribed period of time (step S24). Specifically, the controller 4 determines whether or not the electric voltage output from the manual drive force detector 2 is within the prescribed range during the prescribed period of time.

When the controller 4 determines that the value of the acquired signal is within the prescribed range during the prescribed period of time (Yes in step S24), the controller 4 proceeds to step S25 described below. On the other hand, when the controller 4 determines that the value of the acquired signal is not within the prescribed range during the prescribed period of time No in step S24), the controller 4 returns to the above-described process of step S21.

Next, the controller 4 acquires information on the rotation state of the crank 112 from the rotation state detector 5 (step S25). Specifically, the controller 4 acquires information on the cadence detected by the rotation state detector 5.

Next, the controller 4 determines whether or not the crank 112 stops, or whether or not the crank 112 rotates backward based on the acquired information on the rotation state (step S26). Specifically, the controller 4 determines whether or not the cadence is 0 rpm or less. When the controller 4 determines that the crank 112 stops or the crank 112 rotates backward (Yes in step S26), the controller 4 proceeds to step S27 described below. When the controller 4 determines that the crank 112 does not stop or the crank 112 does not rotate backward, that is, the crank 112 rotates forward (No in step S26), the controller 4 returns to the above-described process of step S21.

Next, the controller 4 executes calibration of the manual drive force detector 2 (step S27). Specifically, the controller 4 executes the calibration such that the value of the signal (for example, the value of the electric voltage) output from the manual drive force detector 2 at the time of executing the calibration corresponds to the zero point of the torque.

Preferably, once the above-described calibration process of the manual drive force detector 2 has been executed, it will not be executed until the power of the bicycle control apparatus 1b is turned off.

While only selected embodiments have been chosen to illustrate the present invention, it will be apparent to those skilled in the art from this disclosure that various changes and modifications can be made herein without departing from the scope of the invention as defined in the appended claims.

MODIFIED EXAMPLE 1

In the above-describe(first and third embodiments, the state detector 3 detects whether or not the operating unit 118 has been operated as the state of the bicycle. However, the present invention is not limited to this. For example, the state detector 3 may detect at least one of movement of the front wheel 106, movement of the rear wheel 107, movement of the crank 112, movement of the handle 104, vibration of the bicycle 101, acceleration of the bicycle 101 and inclination of the bicycle 101 as the state of the bicycle. The manual drive force is not included in the state of the bicycle detected by the state detector 3. In a case of detecting two or more of movement of the front wheel 106, movement of the rear wheel 107, movement of the crank 112, movement of the handle 104, vibration of the bicycle 101, acceleration of the bicycle 101 and inclination of the bicycle 101 as the state of the bicycle, it is determined that the prescribed condition is satisfied in step S2 of FIG. 3 and the step S22 of FIG. 7 when each of the two or more states of the bicycle satisfies the prescribed condition.

In a case in which the state detector 3 detects movement of the front wheel 106 as the state of the bicycle 101, the state detector 3 detects whether or not the front wheel 106 rotates. The controller 4 determines that the state of the bicycle 101 satisfies the prescribed condition when the front wheel 106 rotates after the power of the bicycle control apparatus 1, 1b is turned on. In this case, the state detector 3 is implemented, for example, by a magnetic sensor for detecting a magnet provided on the front wheel 106.

In a case in which the state detector 3 detects movement of the rear wheel 107 as the state of the bicycle 101, the state detector 3 detects whether or not the rear wheel 107 rotates. The controller 4 determines that the state of the bicycle 101 satisfies the prescribed condition when the rear wheel 107 rotates after the power of the bicycle control apparatus 1, 1b is turned on. In this case, the state detector 3 is implemented, for example, by a magnetic sensor for detecting a magnet provided on the rear wheel 107.

In a case in which the state detector 3 detects movement of the crank 112 as the state of the bicycle 101, the state detector 3 detects whether or not the crank 112 rotates. The controller 4 determines that the state of the bicycle 101 satisfies the prescribed condition when the crank 112 rotates after the power of the bicycle control apparatus 1, 1b is turned on. In this case, the state detector 3 is implemented, for example, by a magnetic sensor for detecting a magnet provided on the crank 112.

In a case in which the state detector 3 detects movement of the handle 104 as the state of the bicycle 101, the state detector 3 detects whether or not the handle 104 swivels relative to the frame 102. The controller 4 determines that the state of the bicycle 101 satisfies the prescribed condition when the handle 104 swivels after the power of the bicycle control apparatus 1, 1b is turned on, in this case, the state detector 3 is implemented, for example, by a magnetic sensor for detecting a magnet provided on the handle 104.

In a case in which the state detector 3 detects vibration of the bicycle 101 as the state of the bicycle 101, the state detector 3 detects whether or not the bicycle 101 vibrates. The controller 4 determines that the state of the bicycle 101 satisfies the prescribed condition when the bicycle 101 vibrates after the power of the bicycle control apparatus 1, 1b is turned on. In this case, the state detector 3 is implemented, for example, by a vibration sensor provided on the frame 102.

In a case in which the state detector 3 detects acceleration of the bicycle 101 as the state of the bicycle 101, the state detector 3 detects whether or not the bicycle 101 accelerates. The controller 4 determines that the state of the bicycle 101 satisfies the prescribed condition when the bicycle 101 accelerates after the power of the bicycle control apparatus 1, 1b is turned on. In this case, the state detector 3 is implemented, for example, by an acceleration sensor provided on the frame 102.

In a case in which the state detector 3 detects inclination of the bicycle 101 as the state of the bicycle 101, the state detector 3 detects whether or not the bicycle 101 is inclined. The controller 4 determines that the state of the bicycle 101 satisfies the prescribed condition when the bicycle 101 is inclined after the power of the bicycle control apparatus 1, 1b is turned on. In this case, the state detector 3 is implemented, for example, by a gravity detection sensor provided on the frame 102.

MODIFIED EXAMPLE 2

In the above-described embodiments, the manual drive force detector 2 detects the torque acting on the crank axle 112a as the manual drive force. However, the present invention is not limited to this. For example, the manual drive force detector 2 may detect a tensile force of the chain 110 as the manual drive force. The force acting on the chain 110 is measured by providing a strain gauge, for example, on a bottom bracket or a frame supporting section for supporting the rear wheel 107.

MODIFIED EXAMPLE 3

In the above-described embodiments, the manual drive force detector 2 outputs electric voltage as a signal corresponding to the manual drive force. However, the present invention is not limited to this. For example, the manual drive force detector 2 may output electric current or the like instead of electric voltage.

MODIFIED EXAMPLE 4

In the above-described second embodiment, the controller 4 determines whether or not the crank 112 stops, or whether or not the crank 112 rotates backward in the process of step S14. However, the present invention is not limited to this.

For example, the controller 4 may determine only whether or not the crank 112 stops in the process of step S14. That is, when the crank 112 rotates backward, the controller 4 returns to the process of step S11. In this manner, by determining only whether or not the crank 112 stops in the process of step S14, more accurate measurement can be achieved. Similarly, in the third embodiment, the controller 4 may determine only whether or not the crank 112 stops in the process of step S26.

MODIFIED EXAMPLE 5

In the above-described second embodiment, the controller 4 returns to the process of step S11 when the controller 4 determines that the prescribed condition is not satisfied in the process of step S12 or step S14. However, the present invention is not limited to this. For example, the controller 4 may end the process without executing the calibration of step S15 instead of returning to the process of step S11. Similarly, in the third embodiment, the controller 4 may end the process without executing the calibration of step S27 instead of returning to the process of step S21 when the controller 4 determines that the prescribed condition is not satisfied in the process of step S24 or step S26.

MODIFIED EXAMPLE 6

In the above-described embodiments, once the calibration has been executed, it will not be executed until the power of the bicycle control apparatus 1, 1*a* or 1*b* is turned off. However, the present invention is not limited to this. For example, the controller 4 may execute the calibration of the manual drive force detector 2 each time the required condition is satisfied.

MODIFIED EXAMPLE 7

In the above-described first and third embodiments, the operating unit 118 is used for selecting the assist condition. However, the operating unit 118 may be a switch used for selecting a lighting state of a headlight provided on the bicycle, for example. Also, in a case in which an electric transmission is provided on the bicycle 101, a gear operating unit for operating this electric transmission may serve as the operating unit 118.

Further, the operating unit 118 may be an operating switch that is provided to execute calibration and used only for calibration. In this case, a display device or an audio output device may be provided on the handle 104, and information for encouraging an operation of the operating unit 118 may be output by the display device or the audio output device when the power is turned on.

MODIFIED EXAMPLE 8

In the above-described first embodiment, the controller 4 executes calibration such that a value of a signal of the manual drive force detector 2 at the time of executing the calibration corresponds to the zero point of the torque. However, a value of a signal of the manual drive force detector 2 when the power is turned on may be stored in a storing section provided in the controller 4, and the calibration may be executed such that the value stored in the storing section corresponds to the zero point of the torque.

MODIFIED EXAMPLE 9

The above-described modified example 1 may be modified to have the following configuration (1) to (8). In a case of detecting two or more of movement of the front wheel 106, movement of the rear wheel 107, movement of the crank 112, movement of the handle 104, vibration of the bicycle 101, acceleration of the bicycle 101 and inclination of the bicycle 101 as the state of the bicycle, it is determined that the prescribed condition is satisfied in step S2 of FIG. 3 and the step S22 of FIG. 7 when each of the two or more states of the bicycle satisfies the prescribed condition.

(1) In a case in which the state detector 3 detects movement of the front wheel 106 as the state of the bicycle 101, the controller 4 determines that the state of the bicycle 101 satisfies the prescribed condition when the front wheel 106 does not rotate after the power of the bicycle control apparatus 1, 1*b* is turned on.

(2) In a case in which the state detector 3 detects movement of the rear wheel 107 as the state of the bicycle 101, the controller 4 determines that the state of the bicycle 101 satisfies the prescribed condition when the rear wheel 107 does not rotate after the power of the bicycle control apparatus 1, 1*b* is turned on.

(3) In a case in which the state detector 3 detects movement of the crank 112 as the state of the bicycle 101, the controller 4 determines that the state of the bicycle 101 satisfies the prescribed condition when the crank 112 does not rotate after the power of the bicycle control apparatus 1, 1*b* is turned on.

(4) in a case in which the state detector 3 detects movement of the handle 104 as the state of the bicycle 101, the controller 4 determines that the state of the bicycle 101 satisfies the prescribed condition when the handle 104 does not swivel after the power of the bicycle control apparatus 1, 1*b* is turned on.

(5) in a case in which the state detector 3 detects vibration of the bicycle 101 as the state of the bicycle 101, the controller 4 determines that the state of the bicycle 101 satisfies the prescribed condition when the bicycle 101 does not vibrate after the power of the bicycle control apparatus 1, 1*b* is turned on.

(6) In a case in which the state detector 3 detects acceleration of the bicycle 101 as the state of the bicycle 101, the controller 4 determines that the state of the bicycle 101 satisfies the prescribed condition when the bicycle 101 does not accelerate after the power of the bicycle control apparatus 1, 1*b* is turned on.

(7) In a case in which the state detector 3 detects inclination of the bicycle 101 as the state of the bicycle 101, the controller 4 determines that the state of the bicycle 101 satisfies the prescribed condition when the bicycle 101 is not inclined after the power of the bicycle control apparatus 1, 1*b* is turned on.

It can be expected that the controller 4 can execute calibration of the manual drive force detector 2 when a manual drive force does not act on the bicycle 101 according to the configuration of modified example 9.

MODIFIED EXAMPLE 10

The above-described third embodiment may be configured not to have step S25 and step S26. In this case, when the answer is Yes in step S24, the process proceeds to step S27. Even in a case in which the prescribed condition is satisfied in step S22, the calibration is not executed while a manual drive force is acting on the crank 112. Therefore, it is possible to prevent a detection value of the manual drive force detector 2. from being detected as a value smaller than the actual manual drive force.

MODIFIED EXAMPLE 11

The above-described embodiments may be configured not to execute calibration until a signal detected by the manual drive force detector 2 such as a value of electric voltage becomes a prescribed value or less when the value of the signal detected by the manual drive force detector 2 is too large at the time of executing the calibration. The prescribed value can be a value obtained by subtracting V2 from V1, where V1 is electric voltage of the system and V2 is the range of electric voltage that corresponds to the range of the torque measured by the manual drive force detector 2.

Thus, the foregoing descriptions of the embodiments according to the present invention are provided for illustration only, and not for the purpose of limiting the invention as defined by the appended claims and their equivalents.

What is claimed is:

1. A bicycle control apparatus for controlling a bicycle having a drive assistance electric motor and an operating unit including a switch, the operating unit configured to select a condition of assistance for the drive assistance motor, the bicycle control apparatus comprising:
   a manual drive force detector configured to detect a manual drive force;
   a state detector configured to detect whether the condition of assistance for the drive assistance electric motor has been selected by the operating unit, the condition of assistance being a ratio of an assist force to a torque acting on a crank axle of the bicycle; and
   a controller programmed to execute calibration of the manual drive force detector based on the state detector detecting that the operating unit has been operated to select the ratio of the assist force to the torque acting on the crank axle for the drive assistance motor and after power of the bicycle control apparatus has been turned on.

2. The bicycle control apparatus according to claim 1, wherein
   the state detector is further configured to detect at least one of movement of a wheel, movement of a crank, movement of a handle, vibration of the bicycle, acceleration of the bicycle and inclination of the bicycle as a state of the bicycle.

3. The bicycle control apparatus according to claim 1, wherein
   the manual drive force is the torque acting on the crank axle of the bicycle.

4. The bicycle control apparatus according to claim 1, wherein
   the manual drive force detector outputs a signal based on the manual drive force.

5. The bicycle control apparatus according to claim 4, wherein
   the controller is programmed to execute the calibration such that a value of the signal at the time of executing the calibration corresponds to a zero point of the manual drive force.

6. The bicycle control apparatus according to claim 4, wherein
   the controller is programmed to execute the calibration when the controller further determines that a value of the signal is within a prescribed range during a prescribed period of time.

7. The bicycle control apparatus according to claim 1, further comprising:
   a rotation state detector is configured to detect a rotation state of a crank of the bicycle, and
   the controller being further programmed to execute the calibration when the controller further determines that the crank stops or the crank rotates backward based on the rotation state.

8. The bicycle control apparatus according to claim 7, wherein
   the rotation state detector is configured to detect cadence as the rotation state.

9. The bicycle control apparatus according to claim 8, wherein
   the controller is programmed to determine that the crank stops or the crank rotates backward when the cadence is zero or less.

10. The bicycle control apparatus according to claim 1, wherein
    the state detector is connected to the operating unit and connected to the controller.

11. A bicycle control apparatus for controlling a bicycle having a drive assistance electric motor, the bicycle control apparatus comprising:
    a rotation state detector configured to detect a rotation state of a crank of the bicycle;
    a manual drive force detector that outputs an electric voltage based on the manual drive force; and
    a controller programmed to execute calibration of the manual drive force detector when the controller determines that a value of the voltage is within a prescribed range during a prescribed period of time and the crank stops or the crank rotates backward based on the rotation state,
    the controller being programmed to execute calibration of the manual drive force detector when the controller determines that a difference between a maximum value of the electric voltage and a minimum value of the electric voltage within the prescribed period of time is approximately six percent or less of a range of torque measured by the manual drive force detector.

12. The bicycle control apparatus according to claim 11, wherein
    the rotation state detector is configured to detect cadence as the rotation state.

13. The bicycle control apparatus according to claim 12, wherein
    the controller is programmed to determine that the crank stops or the crank rotates backward when the cadence is zero or less.

14. The bicycle control apparatus according to claim 11, wherein
    the controller is programmed to execute the calibration such that a value of the voltage at the time of executing the calibration corresponds to a zero point of the manual drive force.

15. The bicycle control apparatus according to claim 14, wherein
    the manual drive force is a torque acting on a crank axle of the bicycle.

* * * * *